Dec. 5, 1950     W. E. MELEGAN ET AL     2,533,194
MULTIPLE DISK TYPE CLUTCH
Filed Feb. 19, 1947
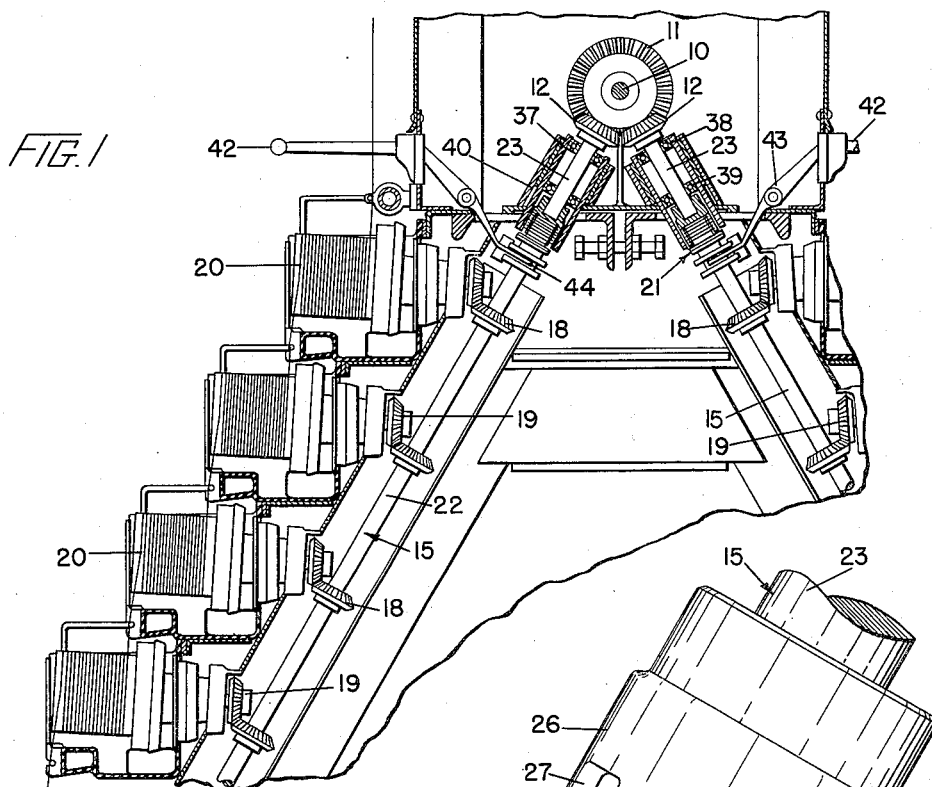
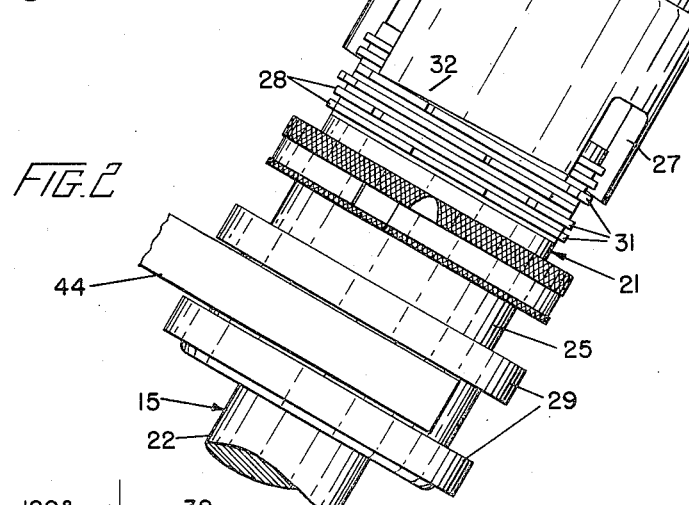
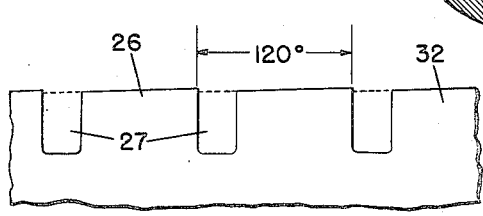
WILLIAM E. MELEGAN &
ALBERT W. EIDMAN
INVENTORS
BY *Frederick L. Bissinger*
ATTORNEY Patented Dec. 5, 1950

2,533,194

UNITED STATES PATENT OFFICE 2,533,194

MULTIPLE DISK TYPE CLUTCH

William E. Mclegan, Cleveland, and Albert W. Eidman, South Euclid, Ohio, assignors to Industrial Rayon Corporation, Cleveland, Ohio, a corporation of Delaware Application February 19, 1947, Serial No. 729,582

4 Claims. (Cl. 192—69)

This invention relates to clutches and, more particularly, to disc or plate friction clutches adapted to couple a drive shaft to a driven shaft.

In clutches where friction discs or plates having lugs are received by a drum or a cylindrical member it is generally impracticable to assemble the clutch elements without first stopping the driving member. It has been proposed in order to avoid stopping the driving member to synchronize the driven shaft to the speed of the driving member by an auxiliary means and then to effect a union of the clutch elements. Where, however, but one shaft is driven and a clutch is employed then obviously the first of the above methods may be followed since the machine can be arbitrarily stopped. In a machine, however, where a plurality of shafts are driven by a main drive shaft it is, of course, not good operation to stop the entire machine in order to correct a condition occurring on one of the driven shafts.

Generally, an insertion of friction discs having lugs into a receiving drum is done while the driving or power device is stopped. This invention, however, advantageously provides for a clutch that is adapted to be inserted while a driving shaft is rotating or while the power device is operating. The clutch, further, readily permits an insertion or removal of a driven shaft without stopping an entire machine. Such an operation is possible by the provision of a receding lug receiving face in the clutch drum against which the lugs are thrust; and which face directs the lugs into drum slots. The lugs when thrust against the drum slide thereover, a disc at a time, and advance to be selectively aligned prior to being thrust into the guide ways by the succeeding entering lugs. Upon the entry of the last friction disc into the drum guide ways the clutch is then desirably closed to provide for a full driving engagement.

The segments of the drum between the guide ways serve, essentially, as a cam designed to direct the friction discs in an advancing manner and to align the discs prior to their entry into the guide ways or slots of the receiving drum or cylinder. The recession of each segment of the face of the drum receiving face is substantially equal to the thickness of a friction disc in order that one disc at a time is adapted to be received by the slots. Then, as the discs are thrust against the segments each disc lug is caused to travel along the surface of such segments a distance forward equivalent to about the thickness of the lug until it is positioned in the guide way entrance whereinto it is forced by the succeeding lugs. Each disc is immediately received by the drum and in a relatively short time all discs are advantageously positioned in the slots. The clutch is then desirably closed to effect a full transmission of power to the driven shaft. The final closure of the clutch can be effected slowly so as not to cause any initial pick-up shock to the driven shaft.

The invention and its advantages will be more apparent in the following specification taken in connection with the accompanying drawing, where:

Figure 1 represents a partial sectional elevation of a spinning machine showing an application of the clutch;

Figure 2 represents, in plan, the clutch receiving drum or cylinder in the act of receiving the clutch friction discs, and;

Figure 3 shows the helical recession of the segments of the disc receiving drum between the lug receiving guide-ways.

In a machine such as a continuous process rayon spinning machine there are generally a number of individual, offset shafts that are driven by a single power source. These driven shafts are adapted, in turn, to drive a plurality of processing devices whereupon a spun filamentary material is processed. The driven shafts are, generally, rotated through ring type gears mounted on a main driving shaft. A single machine may have as many as 50 driven shafts, and a single ring gear may drive at least two. Should, then, an undesirable condition occur on any one of the plurality of driven shafts necessitating its removal it would be obviously disadvantageous to stop the production of the entire machine in order to correct such a condition. The clutch of this invention advantageously permits the quick removal of any single driven shaft, or, when previously removed, its insertion, without disturbing the operation of the remainder of the machine.

Referring to Figure 1, there is shown a portion of a spinning machine having a main driving shaft 10. On the shaft 10 there are mounted ring gears 11. A ring gear 11, in turn, is adapted to drive a pair of shafts 15 through pinion gears 12, which are mounted on the ends of shafts 15 and which are in meshing relation with the ring gear 11. The driven shafts 15, in turn, drive a plurality of thread advancing devices 20 through a plurality of complementary gears 18 and 19.

Each driven shaft 15 is, desirably, comprised of two sections, a long section 22 which is adapted to drive the thread advancing devices 20 and a stub section 23 which is a power transmitting shaft. The stub shaft 23 is aligned with the long section 22 and joined thereto through a clutch 21. On each stub section 23 there is mounted a clutch friction disc receiving drum or cylinder 26 having a plurality of equally spaced lug receiving slots 27; on the adjacent aligned driven shaft 22 there is mounted a sleeve 25 which carries a plurality of friction discs 28 which are receivable by said drum, and a disc locking device as, generally, signified by the annular collar 29. The driven shaft section 22 is thus made independent of the driving gear 11 and of the rest of the machine.

The clutch is more specifically shown in Figure 2. As shown in the figure the friction discs 28 are in the process of being received by the drum 26. The drum 26 is desirably firmly attached to the stub shaft 23, for example, by set screws (not shown) while the sleeve 25 of the clutch 21 is splined or keyed on the driven section 22 to permit its adjustment, and upon adjustment, similarly locked by set screws (not shown). The sleeve 25 carries a plurality of friction discs 28, which, when not in a fully clutched position are loose. The setting of the clutch is accomplished by actuating collar 29 which is adapted to slide on the sleeve 25 and which operates a customary internal locking mechanism which is generally known in the art. The mechanism compresses the friction discs tying them to the sleeve 25 to thus drive the shaft 22 to which the sleeve 25 is splined. Generally the discs 28 are kept separated by undulating flat type springs when not in compressed frictional contact. A plurality of circumferentially spaced cam operated fingers (not shown) are positioned within the sleeve 25 and these upon movement of the collar 29 compress the discs 28. Such a clutch mechanism is advantageous in that a slow power-take-up may be effected by a slow compression of the discs. The described mechanism is disclosed in the United States Patent No. 2,217,357.

The friction discs 28 have a plurality of circumferentially spaced lugs 31. Generally, at least three lugs or a number equal to the receiving slots 27 are equally spaced on each friction disc. The driving is usually effected through the lugs 31 which are received by the slots or guide ways 27 of the drum 26. Under ordinary conditions when the clutch is asembled it is customary to stop the machine. The lugs of the friction discs are then inserted into the receiving drum 26 and the machine is restarted. After the machine is started the clutch is finally fully engaged. As pointed out such a procedure is, of course, disadvantageous where a plurality of shafts are driven by a main driving shaft. By providing cut back segment surfaces in the receiving drum 26 the friction discs can be inserted quite readily while the machine is running. As shown in Figure 2 the surface of each segment 32 recedes from its beginning to its end or to the next slot. The depth of the cut of each segment is equivalent to about the thickness of a lug. Instead of cutting down each segment it may be desirable instead, to cut back the whole of the receiving face of the drum. This latter method, however, tends to introduce an initial eccentricity. The lugs are adapted to slide along these segment surfaces until they contact the next segment, at which time the lugs of one disc are simultaneously aligned with the slots of the receiving drum. Each disc is thrust into the slots by the following friction discs. Once all the friction discs are in position in the drum the clutch can be gradually set by thrusting the collar 29 forwardly on the sleeve 25 which actuates the locking mechanism to cause a slow frictional engagement between the discs.

The clutch can be engaged or disengaged by means of a handle 42 which is adapted to actuate a pivoted member or link 43 having a yoke 44 positioned in an annular recess formed in the collar 29 on the sleeve 25.

To indicate more specifically the helical tapering of the segment surfaces 32 of the drum 26 between the slots 27 the receiving drum periphery is shown as a plane surface in Figure 3. The lug contacting surface of each segment 32 declines from a high point at the beginning of each segment to a low point at the end. The lugs 31 are adapted to move along these surfaces until stopped by the beginning of the next segment at the point of entry into the slots or guide ways 27. When thus aligned the lugs easily slip into the guide ways being forced thereinto by the following discs.

This receiving drum construction advantageously enables a substantially immediate insertion of the friction discs 28 while the drum 26 is rotating. Thus the driven shaft 22 can be disengaged or engaged without stopping the main driving shaft 10. In operation, the handle 42 positioned in the face of the machine is thrust upwardly to move the collar 29 downwardly disengaging the discs 28 from frictional contact. The discs 28, being independent of each other, are rotated in their loose state while the shaft about which they are positioned comes to a standstill. The power is thus cut off from the shaft 22 which can be now safely removed or such other work that may be necessary can be performed on the several reels or on their driving gears. Should, however, it be necessary to remove the shaft 22 for inspection or repair the shaft and the clutch section including the discs are removed and pulled out of contact with the disc receiving drum 26. Upon reassembly the discs 28 are kept loose as they are thrust against the cam surfaces of the segments 32 of the drum 26 sliding thereover into the slots 27. When all of the discs 28 are positioned in the slots of the drum 26 then the handle 42 is pulled down slowly to force the collar 29 upwardly which motion actuates the locking fingers within the sleeve 25 to, in turn, compress the discs 28 into a completely locked position. The compression of the discs is, of course, effected slowly so as to bring the shaft 22 to the speed of the power take-off stub shaft 23. When the speed of the shaft 22 is approximately that of the shaft 23, the discs are then finally locked and a direct drive of shaft 22 is effected.

Further the stub portion 23 is also made advantageously removable from any driving contact with the ring gear 11. For example, it can be positioned in a sleeve 37 wherein it is centered in a pair of anti-friction bearings 38, 39. Sleeve 37, in turn, is positioned within another sleeve 40 which is desirably fixed to the framework of the machine at a particular angle. Sleeve 37 containing the stub section 23 may be held within the sleeve 40 by means of set screws. In the event that the stub shaft 23 should have to be removed, the clutch is first disengaged, the lower portion of the driven shaft removed, the set screws in the side of sleeve 40 loosened and the stub assembly removed. The reverse method is, of course, followed for the reinsertion of this stub section.

Although the invention has been described in connection with a rayon spinning machine its application is, obviously, not limited thereto. A friction disc clutch of the type described can be utilized in any machine which performs a plurality of operations through a plurality of spur shafts where more than one shaft is rotated by a common power source. Further, the clutch can be used in any split shaft for the transmission of power.

We claim:

1. In a clutch having friction discs with lugs positioned about a slidably mounted sleeve splined to a shaft and means for compressing said friction discs to lock them to said sleeve, a friction disc receiving member from which said discs are disengagable comprising; a cylindrical member positioned about a power transmitting shaft aligned with said sleeve mounting said friction discs having a slot for receiving said lugs, said cylindrical receiving member having a lug receiving face inclined to said friction discs for directing said lugs into said slot.

2. In a clutch having friction discs with lugs, and means for compressing said friction discs to lock them to a sleeve about which they are mounted and which is splined to a shaft, a friction disc receiving member comprising; a cylinder from which said discs are disengagable having a plurality of slots for receiving said lugs positioned about a power transmitting shaft aligned with said splined sleeve, said receiving member having surfaces inclined to said lugs between said slots, said lugs being directed by said inclined surfaces into position so as to be received by said slots.

3. A clutch comprising; a drum fixed to a shaft, slots in said drum, a plurality of friction discs having lugs mounted about a sleeve slidably secured to an opposing aligned shaft and being disengagable from said drum upon movement of said sleeve, means associated with said sleeve for compressing said friction discs, said lugs of said discs being adapted to be received by the slots of said drum, and said drum having surfaces inclined to said lugs between said slots for directing said lugs into the said slots.

4. A clutch comprising; a drum fixed to a shaft, slots in said drum, a plurality of friction discs having lugs, a sleeve mounted about an adjacent aligned shaft and slidably secured thereto mounting said friction discs, means associated with sleeve for compressing said friction discs securing them to said sleeve when in said drum slots and for disengaging them from said drum, said lugs of said discs being adapted to be received by said slots, and a cam surface inclined to said friction discs between said drum slots for selectively positioning the lugs of each of said discs prior to their receipt by said slots.

WILLIAM E. MELEGAN.
ALBERT W. EIDMAN.

REFERENCES CITED

The following references are of record in the file of this patent:

UNITED STATES PATENTS

| Number | Name | Date |
| --- | --- | --- |
| 906,041 | Lutz | Dec. 8, 1908 |
| 943,804 | Baumgartner-Mica | Dec. 21, 1909 |
| 952,535 | Loomis | Mar. 22, 1910 |
| 1,036,560 | Campbell | Aug. 27, 1912 |
| 1,960,092 | Taylor | May 22, 1934 |
| 2,174,240 | Glenney | Sept. 26, 1939 |
| 2,437,207 | Noxon | Mar. 2, 1948 |